United States Patent
Valls, Jr.

[11] Patent Number: 6,142,484
[45] Date of Patent: Nov. 7, 2000

[54] COMPOSITE MULTI-PRESSURE GASKET

[75] Inventor: José E. Valls, Jr., Ponce, Puerto Rico

[73] Assignee: Vassallo Research & Development Corporation, Coto Laurel, Puerto Rico

[21] Appl. No.: 09/292,400

[22] Filed: Apr. 15, 1999

[51] Int. Cl.$^7$ .................................................. F16L 17/00
[52] U.S. Cl. ..................... 277/602; 277/608; 277/936; 285/113; 285/232
[58] Field of Search ..................................... 277/602, 936, 277/615, 616, 608, 626, 627; 285/231, 232, 110, 113, 345, 379

[56] References Cited

U.S. PATENT DOCUMENTS

| | | |
|---|---|---|
| D. 323,024 | 1/1992 | Petersson et al. . |
| D. 326,710 | 6/1992 | Valls . |
| D. 330,073 | 10/1992 | Valls . |
| D. 347,885 | 6/1994 | Gustafsson . |
| D. 351,459 | 10/1994 | Andersson . |
| D. 362,902 | 10/1995 | Reiber . |
| D. 374,710 | 10/1996 | Gustafsson . |
| 3,573,871 | 4/1971 | Warner . |
| 3,776,682 | 12/1973 | Parmann . |
| 3,929,958 | 12/1975 | Parmann . |
| 4,030,872 | 6/1977 | Parmann . |
| 4,066,269 | 1/1978 | Linne . |
| 4,120,521 | 10/1978 | Parmann . |
| 4,299,412 | 11/1981 | Parmann . |
| 4,368,894 | 1/1983 | Parmann . |
| 4,372,905 | 2/1983 | Bohman . |
| 4,379,559 | 4/1983 | Bohman . |
| 4,468,042 | 8/1984 | Pippert et al. . |
| 4,572,523 | 2/1986 | Guettouche et al. . |
| 4,602,793 | 7/1986 | Andrick . |
| 4,625,383 | 12/1986 | Vassallo et al. . |
| 4,637,618 | 1/1987 | Valls . |
| 4,666,165 | 5/1987 | Nordin . |
| 4,693,483 | 9/1987 | Valls . |
| 4,723,905 | 2/1988 | Vassallo et al. . |
| 4,818,209 | 4/1989 | Petersson et al. . |
| 4,826,028 | 5/1989 | Vassallo et al. . |
| 4,834,398 | 5/1989 | Guzowski et al. . |
| 4,834,430 | 5/1989 | Vassallo et al. . |
| 4,856,561 | 8/1989 | Zicaro . |
| 4,984,831 | 1/1991 | Bengtsson . |
| 5,057,263 | 10/1991 | Bengtsson . |
| 5,064,207 | 11/1991 | Bengtsson . |
| 5,213,339 | 5/1993 | Walworth . |
| 5,219,189 | 6/1993 | Demoisson et al. . |
| 5,295,697 | 3/1994 | Weber et al. . |
| 5,639,959 | 6/1997 | Reiber . |
| 5,649,713 | 7/1997 | Ledgerwood . |
| 5,695,201 | 12/1997 | Wheeler . |
| B1 4,343,480 | 6/1989 | Vassallo . |

OTHER PUBLICATIONS

Brochure entitled "Anger–Lock F576", Forsheda. (Undated).
Brochure entitled "Power–Lock F601", Forsheda Pipe Seal Division. (Undated).

Primary Examiner—Lynne H. Browne
Assistant Examiner—William L. Miller
Attorney, Agent, or Firm—Roylance, Abrams, Berdo & Goodman

[57] ABSTRACT

A composite gasket for forming a seal between a pipe bell and a spigot comprises a first axially disposed portion formed of an elastomeric material and has a first leading edge and a first trailing edge, and a second axially disposed portion, adjacent the first axially disposed portion, formed of a generally non-elastomeric substantially rigid plastic, which comprises multiple, axially extending, laterally spaced apart, ramp-like projections separated by circumferential valleys, which expose elastomeric material. Fluid entering the valleys during a high pressure surge force the composite gasket into a tighter seal.

10 Claims, 6 Drawing Sheets

COMPOSITE MULTI-PRESSURE GASKET

FIELD OF THE INVENTION

The present invention relates to a composite gasket comprising an elastomeric portion and a hard plastic non-elastomeric portion for forming a groove in a plastic pipe bell and for providing a secure seal between the bell and a spigot. Additionally, the present invention relates to an improved pipe joining system including the composite gasket.

BACKGROUND OF THE INVENTION

In plastic pipe systems, connections between the various components must be sealed to prevent escape of fluids from the connections. The connections typically comprise an enlarged bell which receives a spigot. The spigot and bell can be formed as segments of pipe lengths or connecting members, such as elbows, T's, etc. In this application, the terms "fitting" and "pipe" are intended to include both pipe lengths and connecting members.

The seal between the bell and spigot is conventionally provided by a gasket mounted in one of the components of the connection and sealingly and resiliently engaging the other component. Most often, the seal is mounted in the bell and has at least one radially inwardly projecting sealing lip which is engaged and deformed by the spigot such that a tight interference fit is formed between the spigot and sealing lip to prevent the escape of fluid.

Gaskets formed exclusively of elastomeric material, such as natural rubber, are disadvantageous since they can be displaced from their intended position so as not to provide an adequate seal. For example, such gaskets may be pushed from their intended position during insertion of the spigot within the bell.

Gaskets reinforced with metal bands can be deformed and the metal can corrode causing the gaskets to leak. Moreover, when such gaskets are made an integral segment of the pipe spigot, deformation or corrosion of the metal band can cause the entire pipe section to leak.

Gaskets reinforced with plastic locking rings have been increasingly used. Such gaskets are described in U.S. Pat. No. 4,343,480 to Vassallo, which is hereby incorporated by reference in its entirety.

More recently, joining systems combining the use of a hard plastic forming segment, a retaining ring and an elastomeric gasket have been used. A system employing the combination of an EPSMI ring and a rubber gasket is disclosed in U.S. Pat. No. 4,723,905 to Vassallo and Valls, which is hereby incorporated by reference in its entirety. A further combination of a gasket having a hard plastic forming segment and an elastomeric gasket is shown in U.S. Pat. No. Des. 330,073 to Valls, which is hereby incorporated by reference in its entirety.

Although such combination forming segment/elastomeric gasket systems reduce the amount of soft rubber used, the cost of elastomeric materials, such as rubber, has significantly increased in recent years, thus forming a significant factor in the cost of fittings. While gaskets using locking rings and other systems including hard plastic contain less rubber than those made entirely of rubber, the rubber still forms a significant portion of the gasket and greatly affects its cost.

In addition to being expensive, soft rubber has a high compression set. Compression set causes rubber to lose some of its initial resistance or pressure in pipe joints and this effect reduces the capacity to seal especially under high pressure surges.

SUMMARY OF THE INVENTION

It has now been discovered that the disadvantages associated with the use of conventional gaskets, including those used in combination with hard plastic segments have been eliminated by the multi-pressure composite gasket of the present invention. Surprisingly, a composite gasket for forming a tighter seal has been developed, which gasket comprises a first axially disposed portion formed of an elastomeric material and having a first leading edge and a first trailing edge. The composite gasket also comprises a second axially disposed portion, adjacent the first axially disposed portion, comprising a non-elastomeric, substantially non-flexible or rigid plastic and having multiple, axially extending, laterally spaced apart, ramp-like projections or ribs separated by circumferential valleys. The second axially disposed portion has a second leading edge and a second trailing edge, with the second leading edge in contact with the first trailing edge of the first axially disposed portion.

The axially disposed elastomeric material is exposed in the circumferentially disposed valleys to provide contact points for errant fluid (e.g., a liquid such as water) resulting from high pressure surges to actually force the composite gasket into a more secure fit in the pipe joint.

In preferred embodiments, the trailing edge of the elastomeric portion of the gasket has a concave portion or pocket to receive errant fluid under high pressure surges. This embodiment of the invention not only reduces the amount of elastomer needed for a specific gasket thickness, thus reducing costs, but, in addition, utilizes the pressure of errant fluid in the elastomeric pockets to create an outward pressure inside the gasket to expand and tighten the soft elastomeric portion against the pipe bell and between the bell and spigot. Thus, the greater the water pressure inside the pocket, the tighter the seal becomes. While compression set of the elastomer, such as rubber, causes the rubber to soften and to lose some of its initial resistance or pressure in pipe walls which would normally reduce the capacity to seal, particularly under high fluid pressure surges, exposure of the softened elastomeric portion of the composite gasket to high pressure errant fluid in the valleys, particularly in the form of pockets in the elastomer, actually improves the seal. Thus, the high pressure fluid against the elastomer or in the pockets forces the gasket into a tighter seal.

BRIEF DESCRIPTION OF THE DRAWINGS

Referring to the drawings which form a part of this disclosure.

DETAILED DESCRIPTION OF PREFERRED EMBODIMENTS

Figure 1:
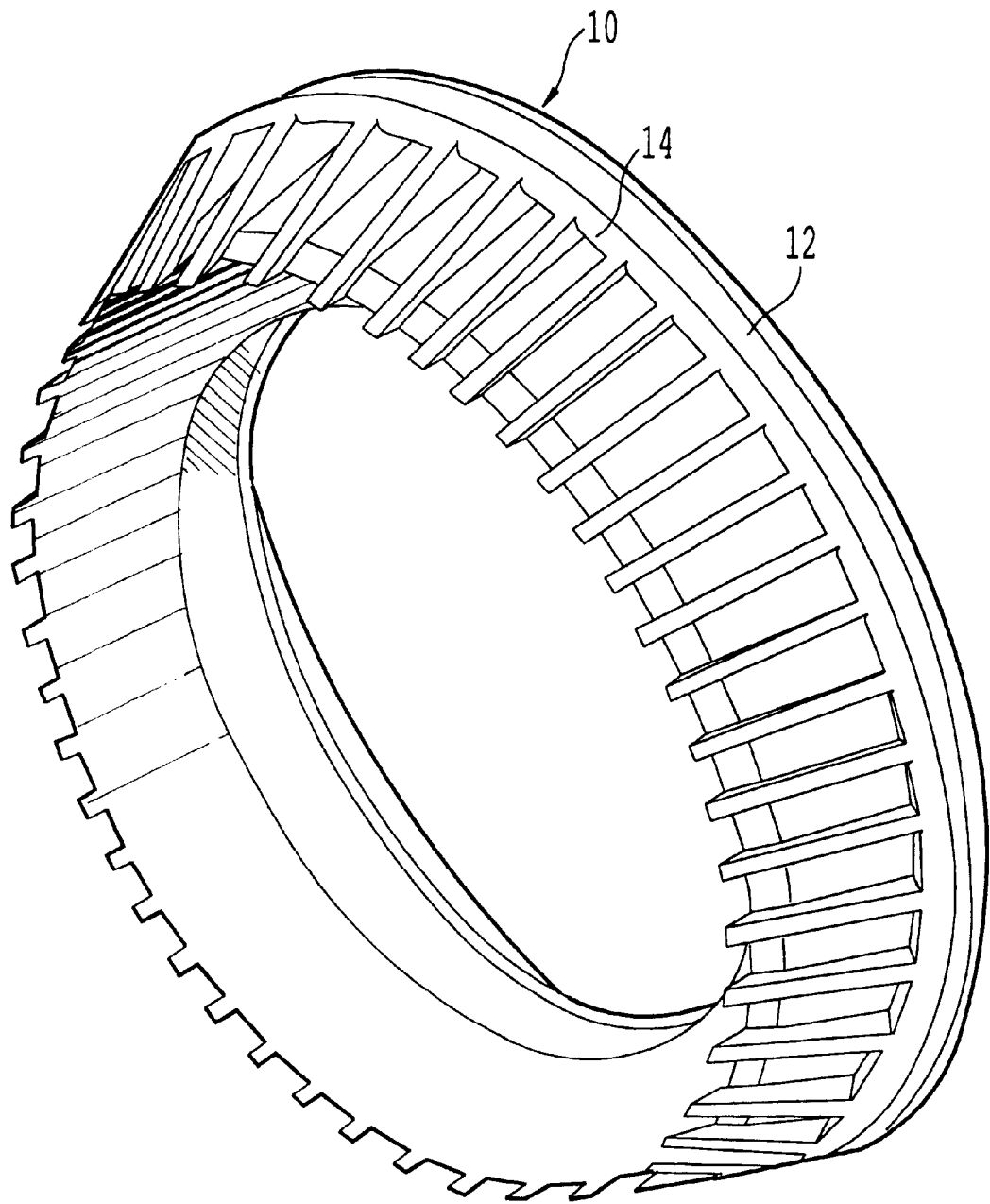
FIG. 1 is a perspective view of a molded and fused composite hard plastic/elastomeric gasket in accordance with a first embodiment of the present invention.

Although specific terms are used in the following description for the sake of clarity, these terms are intended to refer to only the particular structure of the invention selected for illustration in the drawings, and are not intended to define or limit the scope of the invention.

Referring initially to FIGS. 1, 1A, 2 and 3, the composite gasket 10 of the present invention comprises a first axially disposed portion 12 formed of an elastomeric material and a second axially disposed portion 14 adjacent the first axially disposed portion 12 formed of a generally non-flexible, non-elastomeric material plastic. As shown more particularly in FIGS. 1A and 2, the first axially disposed portion formed of elastomeric material has a leading edge 16 and a concave trailing edge or pocket 18. The first elastomeric portion also is provided with a sealing lip 20 extending radially inwardly. Typically, the elastomeric portion 16 is formed of a thermoplastic elastomeric resilient material, such as a natural rubber, synthetic rubber, including styrene-butadiene copolymer, neoprene, buty rubber, nitrile rubber, silicone rubber and the like, a blend of natural and synthetic rubbers, but preferably, a thermoplastic elastomer which will comply with specifications for elastomeric gaskets for joining plastic pipe, such as those, for example, provided by ASTM standard specifications, such as ASTM Specification F477-96a, published November 1996. A suitable thermoplastic elastomer is, for example, commercially available under the name "Santoprene" commercially available from Monsanto and "Thermolast K" compound TC 6 C AA commercially available from Gummiverk Kraiburg Elastik GmbH.

The first axially disposed elastomeric portion 12 is joined to a second axially disposed portion 14. The second portion comprises multiple axially extending, laterally spaced ramp-like projections or ribs 24 separated by circumferential valleys 26. The non-elastomeric portion 14 comprising the ramp-like projections or ribs 24 is formed of substantially non-flexible or hard plastic for use in forming portion 14 and may include polyolefins, such as polyethylene or polypropylene, poly(vinylchloride), and the like materials which are usually synthetic, thermoplastic polymers and capable of being processed by extrusion, molding, etc., but which are not capable of rapidly returning to the original length after being significantly stretched, which can be adhered or preferably fused to the elastomeric portion 12 in a single molding step. Suitable plastic useful for the hard plastic portion and the elastomeric portion are disclosed in U.S. Pat. No. 4,693,483 to Valls and in U.S. Pat. No. 4,723,905 to Vassallo and Valls, the entire disclosures of which are hereby incorporated by reference.

Figure 1A:
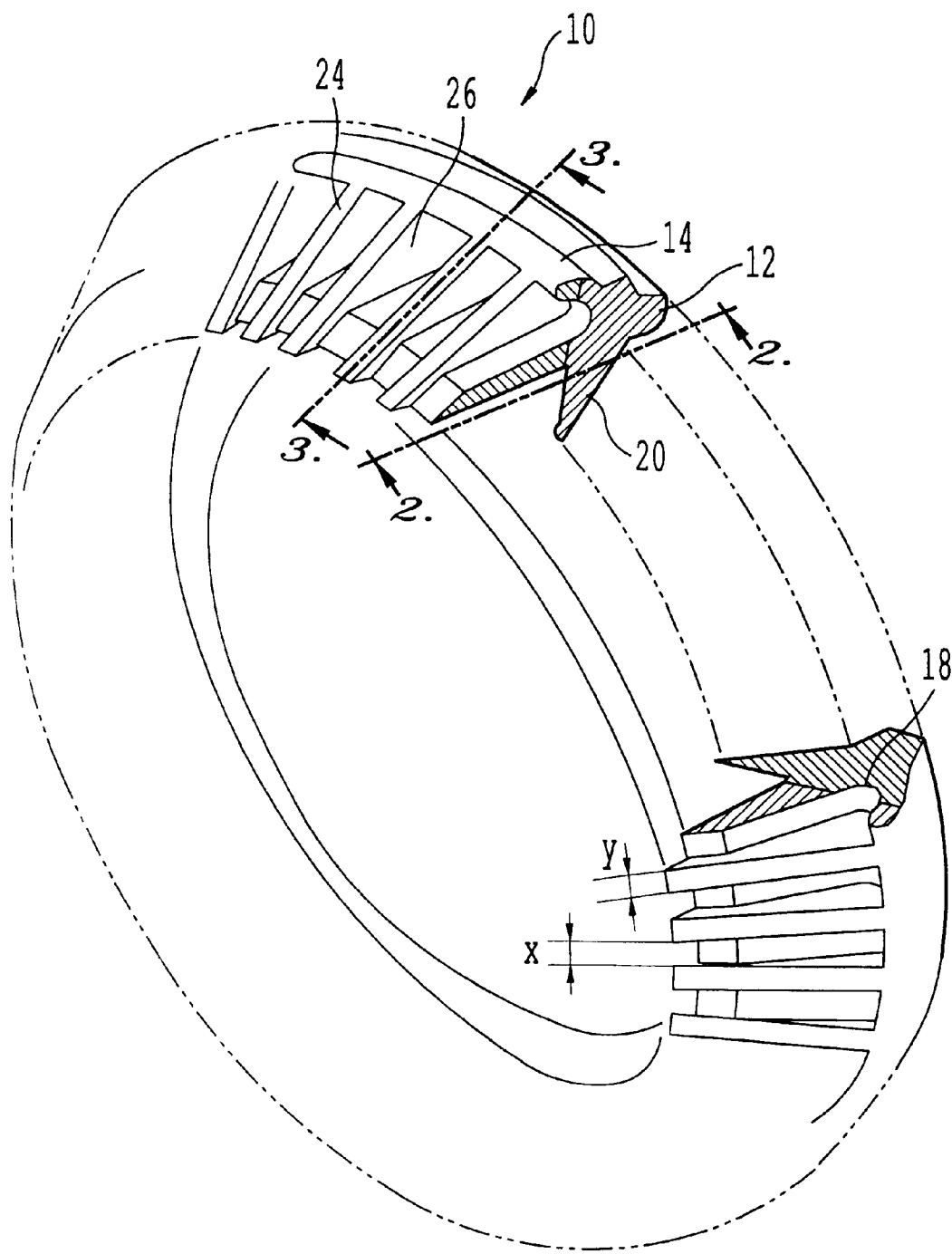
FIG. 1A is a perspective view of the plastic/elastomeric gasket of FIG. 1, with a portion broken away.
Figure 2:
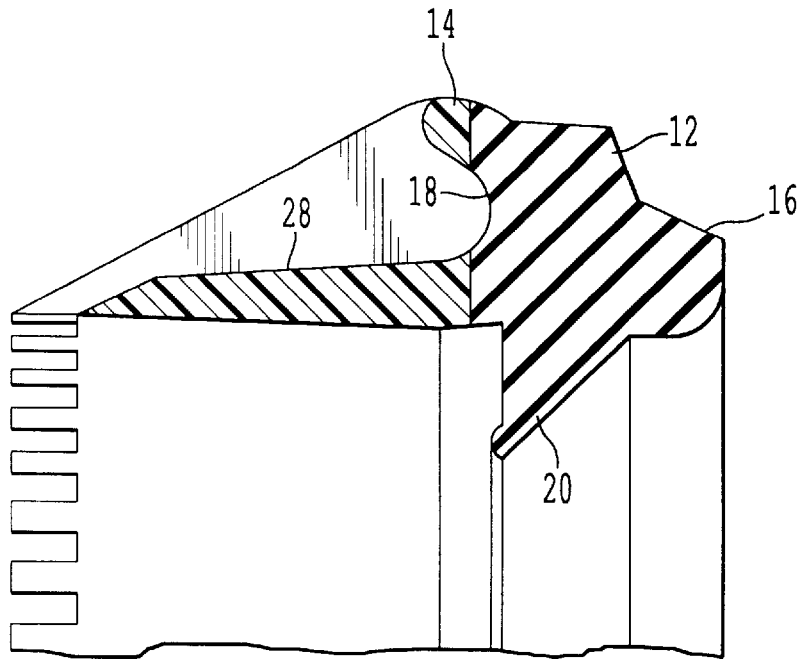
FIG. 2 is an enlarged, side elevational view in section taken along line 2—2 of FIG. 1A.
Figure 3:
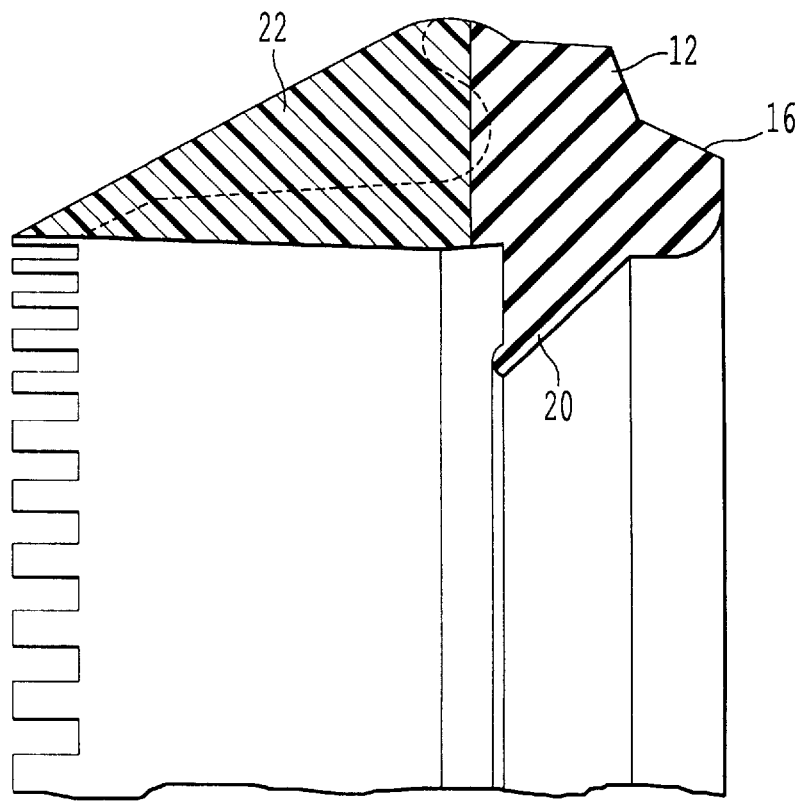
FIG. 3 is an enlarged, side elevational view in section similar to FIG. 2, but taken along line 3—3 of FIG. 1A.

As seen more specifically in FIGS. 1A and 2, the trailing edge 18 of the elastomeric portion of the composite gasket is exposed in the valley 26 and is capable of fluid communication with the sealing lip 20 since ramp-like projections 24 extend beyond the internal ramp portions 28, thereby providing openings for errant fluid or water to enter and contact both the exposed trailing edge 18 of the elastomeric portion 12 and sealing lip 20. The valley width, X, may be any dimension that will provide suitable access to the elastomer exposed between ramps 24, while maintaining structural integrity of the composite gasket 10. The ramp-like projections or ribs 24 have a width Y. For example, a suitable ratio of X to Y includes about 2:1.

Figure 4:
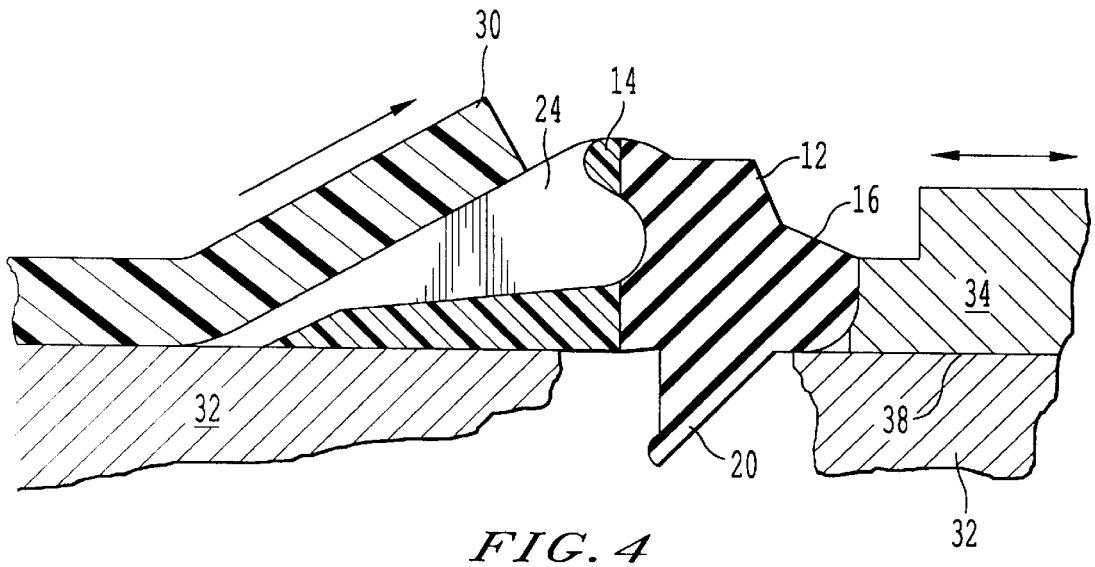
FIG. 4 is an enlarged, partial, side elevational view in section showing a softened pipe advancing over the hard plastic ramp in the initial stage of forming a pipe bell groove over the composite gasket of FIG. 1.
Figure 5:
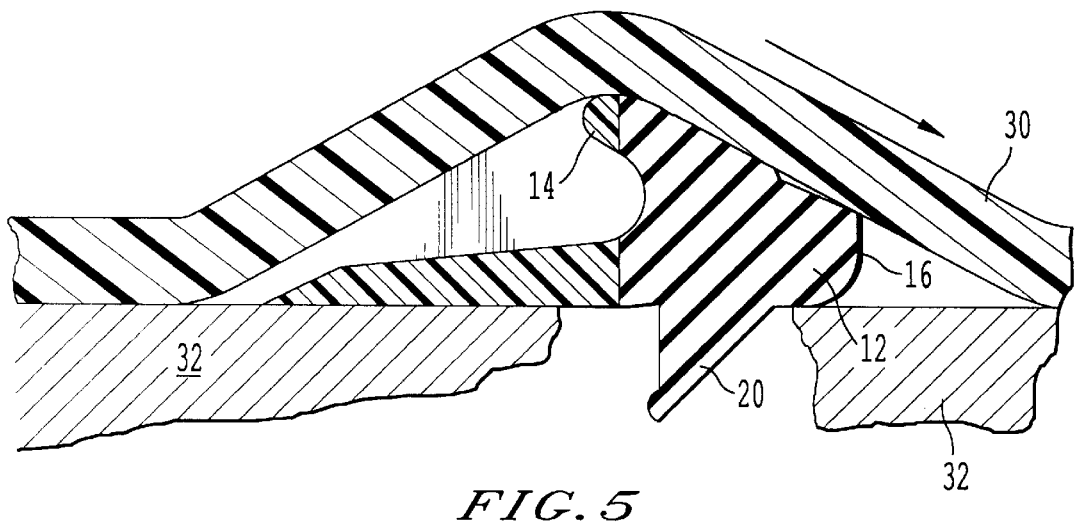
FIG. 5 is an enlarged, partial, side elevational view in section similar to FIG. 4, but showing a final stage of forming a pipe bell over the composite gasket of FIG. 1.

Referring to FIGS. 4 and 5, composite gasket 10 is designed to be first applied to a belling mandrel of the type shown and described in U.S. Pat. No. 4,723,905, the entire disclosure of which is hereby incorporated by reference. The composite gasket of the present invention will be encapsulated within the bell or socket of a length of plastic pipe after the bell or socket has been formed on the belling mandrel. FIGS. 4 and 5 illustrate a method of forming a groove in a fitting or pipe bell in which the groove is formed by the composite gasket during the belling operation and retains the composite gasket in place.

Composite gasket 10 may be provided with a locking shoulder to fit in the belling mandrel to aid in preventing movement of gasket 10 during formation of the socket. However, adequate frictional engagement may be provided by deformation of sealing lip 20 against the belling mandrel. One end of pipe or fitting 30 has been heated and passed over a belling mandrel to form the bell. Pipe end 30 is pushed along mandrel 32 and over composite gasket 10 as illustrated in FIGS. 4 and 5 to form the groove. As shown in FIG. 4, the rigid, non-elastomeric plastic second portion 14 provides a good molding surface for forming the groove. Mandrel 32 is provided with a supporting metal ring 34 which can be displaced axially on the surface 38 of the mandrel 32. In the operation shown in FIG. 4, the supporting ring 34 abuts the leading edge 16 of the elastomeric portion 12 of the composite gasket 10 to hold it in place on the mandrel as the softened pipe end 30 is pushed and expanded around the gasket to form the socket. Upon subsequent cooling, the fitting or pipe groove with the gasket retained therein can be removed from the mandrel.

Thus, during the belling operation, a previously heated and softened end of a length of plastic pipe 30 is introduced to the mandrel and forced to ride upwardly over ramp 24 and downwardly over elastomeric portion 12. Prior to the complete passage of the softened end of plastic pipe 30 over leading edge 16 and contact with mandrel 32, the metal supporting ring 34 is quickly retracted axially away from leading edge 16 to a position (not shown) sufficiently downstream from the softened end of plastic pipe 30 to permit contact of the softened end of plastic pipe 30 with mandrel 32, as shown in FIG. 5. On retracting the supporting ring 34 from the position shown in FIG. 4, the end of plastic pipe 30 will conform inwardly against the surface of mandrel 32. Apparatus including a ring for supporting composite gaskets during socket formation is shown, for example, in U.S. Pat. Nos. 3,776,682 and 4,030,872, the entire disclosures of which are hereby incorporated by reference.

Figure 6:
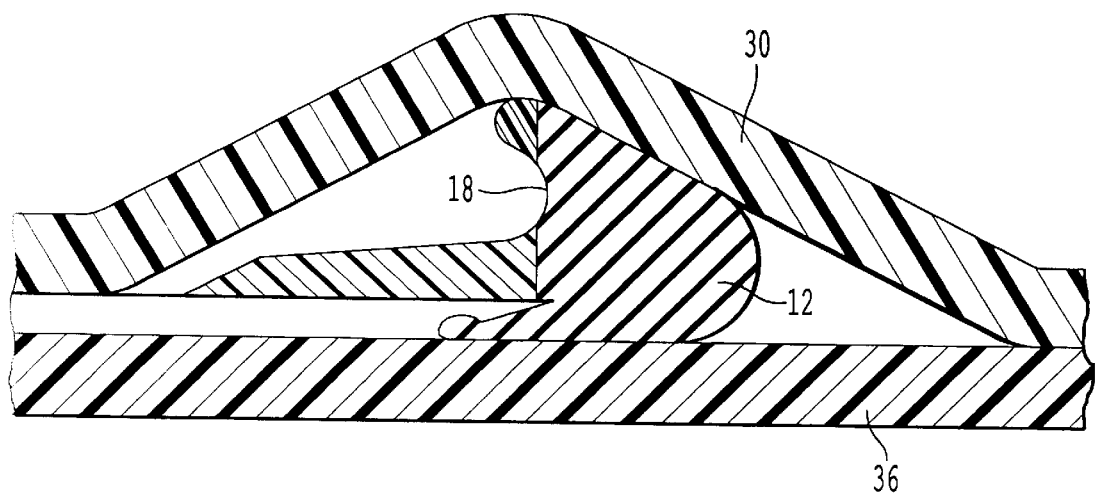
FIG. 6 is an enlarged, partial side elevational view in section of the composite gasket and bell of FIG. 5 after insertion of a spigot.

In FIG. 6, the spigot end of a pipe 36 has been inserted in pipe 30 to form a pipe joint. The elastomeric gasket portion 12 is firmly seated in the groove to tightly seal the spigot end of adjacent pipe section 36 so as to provide a leak-proof junction when the system is pressurized. However, because the elastomeric portion 12 has a high compression set, it loses some of the initial resistance or pressure required to fully seal the joint, and thus, reduces capacity to seal, particularly under high pressure changes.

Figure 7:
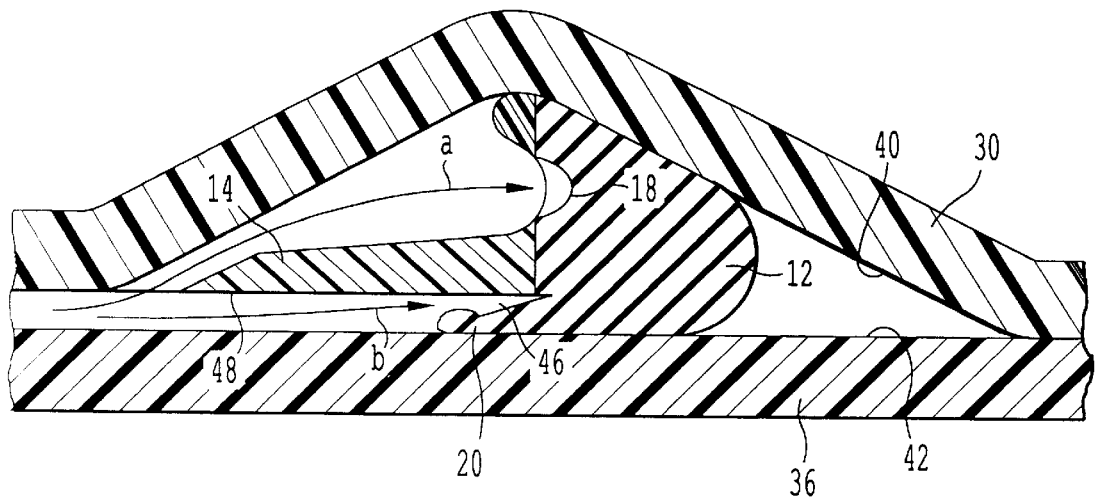
FIG. 7 is a side elevational view in section of the composite gasket in the spigot and bell of FIG. 6 after an outward pressure has been created by pressurized liquid to force the composite gasket into a tighter seal between the pipe bell and spigot in accordance with the present invention.

As shown in FIG. 7, errant liquid (arrow A) entering the pipe joint under high pressure surges will actually apply pressure in pocket 18 of the elastomeric gasket portion to expand pocket 18 and to apply pressure to the elastomeric portion 12 between the sealing lip 20 and hard plastic portion 14 to create an outward pressure inside the elastomeric portion 12 of the composite gasket in the direction shown by arrows a and b to expand and tighten the seal formed by the elastomeric portion of the gasket further in the direction of the arrows. This means that the higher the pressure caused by the pressurized liquid, the tighter the elastomeric gasket portion will be wedged between walls 40 and 42 forming the pipe joint.

Thus, in accordance with the present invention, the composite gasket of the present invention is specifically designed to permit pressurized liquid to flow between the ramp-like segments 24 so as to contact the pockets 18 formed in the elastomeric gasket portion 12 and to also contact the pocket 46 formed between the sealing lip 20 and surface 48 of the rigid portion of the gasket to force the elastomeric gasket portion into a tighter seal between the pipes 30 and 42.

Figure 8:
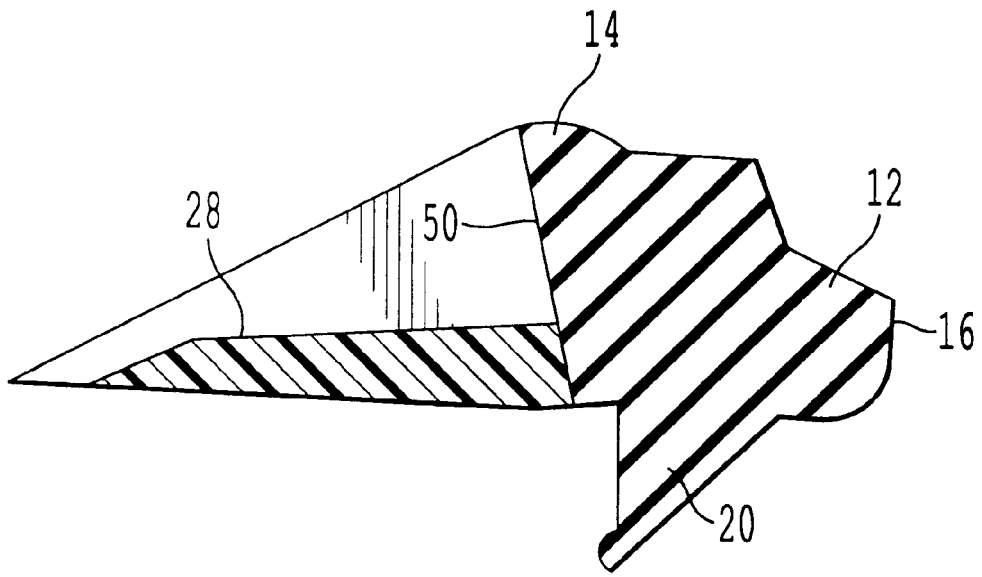
FIG. 8 is an enlarged partial elevational view in section similar to FIG. 2 of a second embodiment of the composite gasket of the present invention.
Figure 9:
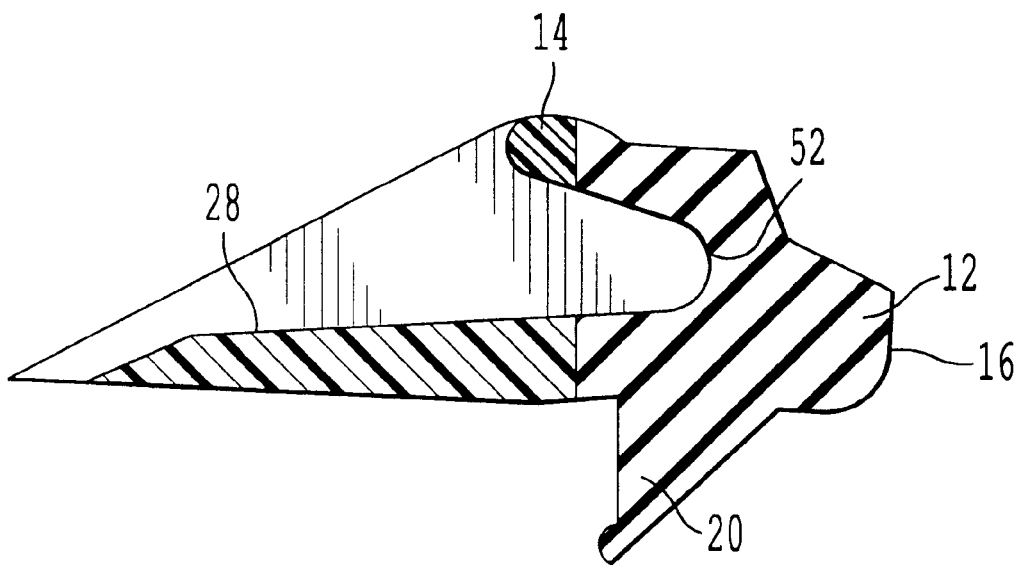
FIG. 9 is an enlarged partial elevational view in section similar to FIG. 2 of a third embodiment of the composite gasket of the present invention.

FIGS. 8 and 9 are similar to FIG. 2 of the drawings, but illustrative of further embodiments of the present invention. Like numbers refer to like parts. FIG. 8 discloses the provision of a more planar elastomeric surface 50 without any significant pocket for the pressurized liquid to enter the elastomeric portion 12 of the composite gasket. The embodiment of FIG. 8 utilizes more elastomeric material than the embodiment of FIG. 2, but similarly provides a significant elastomeric surface exposed to pressurized liquid during pressure surges, thereby providing an improved seal for the pipe joint. FIG. 9 illustrates a further embodiment of the present invention in which deeper pocket 52 internal of the elastomeric gasket portion 12, is used as compared with the pocket 18 of FIG. 2. The embodiment of FIG. 9, further reduces the amount of elastomeric material required while also providing increased exposed internal pocket area in the elastomeric portion for application of pressure by the pressurized liquid.

While advantageous embodiments have been chosen to illustrate the invention, it will be understood by those skilled in the art that various changes and modifications can be made therein without departing from the scope of the invention as defined in the appended claims.

What is claimed is:

1. A composite gasket for forming a seal between a pipe bell and a spigot comprising:
    a first, axially disposed portion formed of an elastomeric material and having a first leading edge and a first trailing edge,
    a second axially disposed portion, adjacent said first axially disposed portion, formed of a non-elastomeric substantially non-flexible plastic and comprising multiple, axially extending, circumferentially spaced apart, ramp-like projections separated by circumferentially spaced apart valleys,
    said second axially disposed portion having a second leading edge and a second trailing edge, said second leading edge of said second axially disposed portion being in contact with said first trailing edge of said first axially disposed portion,
    said first axially disposed elastomeric material being exposed in said circumferentially spaced apart valleys for access to fluid pressure.

2. A composite gasket according to claim 1, wherein said circumferentially spaced apart valleys are formed by adjacent said ramp-like projections separated by ramp-like indentations.

3. A composite gasket according to claim 1, wherein said first trailing edge has a concave portion.

4. A composite gasket according to claim 1, wherein said first trailing edge has a planar portion.

5. A composite gasket according to claim 1, wherein said first axially disposed portion has a radially extending sealing lip.

6. A composite gasket according to claim 5, wherein said elastomeric material exposed in said valleys is in fluid communication with said radially extending sealing lip.

7. A composite gasket according to claim 1, wherein said second trailing edge is formed of said, spaced apart ramp-like projections.

8. A composite gasket according to claim 1, wherein said first axially disposed portion and said second axially disposed portion are fused together at said first trailing edge and second leading edge.

9. A pipe fitting for a plastic pipe system, comprising:
    a first, axially disposed portion formed of an elastomeric material and having a first leading edge and a first trailing edge,
    a second axially disposed portion, adjacent said first axially disposed portion, formed of a generally non-elastomeric plastic and comprising multiple, axially extending, circumferentially spaced apart, ramp-like projections separated by circumferentially spaced apart valleys,
    said second axially disposed portion having a second leading edge and a second trailing edge, said second leading edge of said second axially disposed portion being in contact with said first trailing edge of said first axially disposed portion,
    said first axially disposed elastomeric material being exposed in said circumferentially spaced apart valleys for access to fluid pressure.

10. A pipe joint formed by inserting the insert end of a first plastic pipe into the socket of a second plastic pipe, said second plastic pipe having a circumferential groove in which is disposed a composite gasket having a first, axially disposed portion formed of an elastomeric material and having a first leading edge and a first trailing edge,
    a second axially disposed portion, adjacent said first axially disposed portion, formed of a generally non-flexible plastic and comprising multiple, axially extending, circumferentially spaced apart, ramp-like projections separated by circumferentially spaced apart valleys,
    said second axially disposed portion having a second leading edge and a second trailing edge, said second leading edge of said second axially disposed portion being in contact with said first trailing edge of said first axially disposed portion,
    said first trailing edge of said first axially disposed portion being exposed in said circumferentially spaced apart valleys, said first axially disposed portion having a radially inwardly extending sealing lip in sealing contact with the outer surface of said first plastic pipe, said first axially disposed elastomeric material being exposed in said circumferentially s paced apart valleys for access to fluid pressure,
    said circumferentially spaced apart valleys being in fluid communication with said sealing lip.

* * * * *